US005507908A

United States Patent [19]

Fukushima et al.

[11] Patent Number: 5,507,908

[45] Date of Patent: Apr. 16, 1996

[54] COLORING APPARATUS

[75] Inventors: Mitsuru Fukushima; Kunihiko Kanai; Kouki Mochizuki; Wataru Ogura; Satoru Takizawa, all of Suwa, Japan

[73] Assignee: Chinon Industries, Incorporated, Suwa, Japan

[21] Appl. No.: 252,758

[22] Filed: Jun. 2, 1994

[51] Int. Cl.$^{6}$ .............................. B44C 1/17; B32B 31/00

[52] U.S. Cl. .......................... 156/363; 156/361; 156/540; 156/541; 156/577; 156/234; 156/238

[58] Field of Search .................................... 156/234, 238, 156/540, 360, 361, 362, 363, 230, 233, 541, 542, 543, 574, 577

[56] References Cited

U.S. PATENT DOCUMENTS

| | | | |
|---|---|---|---|
| 1,136,497 | 4/1915 | Swallow | 156/577 |
| 3,308,002 | 3/1967 | Hurwich et al. | 156/577 |
| 3,321,353 | 5/1967 | Zelnick | 156/383 |
| 3,765,992 | 10/1973 | Stageberg | 156/521 X |
| 3,815,494 | 6/1974 | Bahnmüller | 101/22 X |
| 4,006,267 | 2/1977 | Kurz et al. | 427/14 |
| 4,048,913 | 9/1977 | Navi | 101/27 |
| 4,158,590 | 6/1979 | Hamisch, Jr. | 156/577 X |
| 4,255,218 | 3/1981 | Stageberg | 156/238 X |
| 4,328,062 | 5/1982 | Off et al. | 156/361 X |
| 4,345,966 | 8/1982 | Iiyama | 156/523 X |
| 4,636,276 | 1/1987 | Nozara | 156/361 X |
| 4,718,971 | 1/1988 | Summers | 156/540 X |
| 4,904,334 | 2/1990 | Honma et al. | 156/540 X |
| 4,980,011 | 12/1990 | Gruber | 156/361 X |
| 5,316,613 | 5/1994 | Samuelson et al. | 156/234 X |

FOREIGN PATENT DOCUMENTS

| | | | |
|---|---|---|---|
| 0493038A1 | 12/1994 | European Pat. Off. | G03G 19/00 |
| 60-099681 | 3/1985 | Japan | B41J 29/26 |

*Primary Examiner*—James Engel
*Assistant Examiner*—Charles Rainwater
*Attorney, Agent, or Firm*—Hickman & Beyer

[57] ABSTRACT

A coloring apparatus comprises a transfer head C having a heating element elastically protruding from an apparatus body 1, a tape accommodating portion B, and a tape feeding portion A having a winding up shaft 17, etc., which are incorporated within the apparatus body 1. A using method comprises, holding the apparatus body 1, pressing the transfer head C on the copied image of the xerographic copy, and heating by a heating element. Next, the apparatus body 1 is moved as the transfer head C is pressed onto the copied image, whereby the colored donor layer is peeled off from the transfer tape to stick the colored donor layer onto the copied image on the xerographic copy.

12 Claims, 11 Drawing Sheets

COLORING APPARATUS

BACKGROUND OF THE INVENTION

1. Field of the Invention

The present invention relates to a coloring apparatus for selectively coloring a copied image on a xerographic copy.

2. Related Background Art

A printing method called xerography has been conventionally well known. The printing method is a method where a photosensitive plate with electrostatic charge is exposed to form a latent image on it, the latent image is developed with toner to a visible image, the visible image is transferred to a sheet of paper and then the image is photographically fixed as a positive image. A method for giving coloring to a copied image of the xerographic copy (or picture) formed by the above mentioned method has been also proposed. Specifically, at first, a transfer sheet with a predetermined colored layer is superimposed on the formed xerographic copy. When it is heated, the toner on the xerographic copy is melted and the toner becomes tacky, as a result of which the layers including the colored layer of the transfer sheet remains on the copied image in a shape of the portion touching the copied image, after the transfer sheet is peeled off.

A transfer sheet and coloring apparatus to be used in the above mentioned method are disclosed in for example U.S. Pat. No. 4,006,267. The coloring apparatus is illustrated in FIG. 1. The coloring apparatus includes a pair of rollers 103 which presses a substrate 101 to be transferred on and a transfer sheet 102 together, while heating them.

As illustrated in FIG. 2, a toner 104, which forming a part of a copied image, is photographically fixed on the surface of the substrate 101. When, using the apparatus of FIG. 1, the substrate 101 and the transfer sheet 102 are pressed together while heated and then the transfer sheet 102 is peeled off, whereby a colored donor layer 107 at a portion in press-contact with the toner 104 is stripped off from the transfer sheet 102 including a metal film 105, so that the colored donor layers 107 are adhered on the toner 104 on the substrate 101. According to this function, it transfers a part of the colored donor layer 107 from the transfer sheet 102 to the toner 104 on the substrate 101. By the way, an individual sheet type of transfer sheet including a back sheet 106 is available as illustrated in FIG. 3 besides a roll shape type of the transfer sheet 102 as described in the above.

In the conventional apparatuses as described above, there is a problem that it is easy to transfer the colored donor layer to the entire copied image with the toner 104 on the substrate 101 but when the transfer is done only to a part of the copied image, a process for covering a predetermined part of the substrate 101 with a masking material is needed, resulting in complicated transferring operation.

There is another problem that, after the transfer sheet is cut into an appropriate size, it is ironed with a hot iron or the like, but at that time the iron may touch the other toner on the substrate 101, resulting in blotting of toner or adhering of toner to the iron. In addition to that, the apparatus is not easily carried resulting in restriction of a working place. A further drawback is that the toner at a portion to be transferred is not easily observed because the substrate is under the transfer sheet when transferring.

SUMMARY OF THE INVENTION

An object of the present invention is to provide a copied image coloring apparatus which is appropriate for transferring a colored donor layer to a portion of the xerographic copy.

The foregoing and other objects will become more apparent from a reading of the following description.

The present invention provides a coloring apparatus for coloring a copied image on a xerographic copy by sticking a colored donor layer of a transfer tape onto the copied image, comprising:

- a transfer head for pressing the transfer tape against the copied image on the xerographic copy;
- a heating element disposed in the transfer head, for changing the copied image on the xerographic copy into a stick by heating the copied image at a sufficient temperature so as to stick the colored donor layer onto the copied image when the transfer tape is peeled off from the copied image; and
- tape feeding means for feeding the transfer tape in response to the movement of the transfer head without causing a slip between the xerographic copy and the transfer tape;
- wherein the transfer head is pressed on the copied image and the heating element generates heat, and the transfer tape is fed by the tape feeding means in response to the movement of the transfer head, whereby a part of the colored donor layer of the transfer tape is transferred to the copied image of the xerographic copy.

In this coloring apparatus according to the present invention, the tape feeding means preferably comprises a driving gear rotated by a driving force, and

- a tape winding up shaft engaging with the driving gear with a predetermined friction force, and being coaxially disposed with the driving shaft, and
- wherein the friction force is set for a smaller value than a friction force between the surface of the xerographic copy and the transfer tape pressed by the transfer head.

In this coloring apparatus according to the present invention, the tape feeding means preferably comprises a running roller rotatably supported with respect to a body of the coloring apparatus, being rotated abutting the xerographic copy in response to the movement on the coloring apparatus; and

- a tape winding up shaft which is rotated being connected with the running roller to wind up the transfer tape.

Additionally the coloring apparatus of the present invention preferably comprises an urging means for elastically pressing the transfer head onto the xerographic copy against the body of the coloring apparatus.

Here, "copied image" means a visible electrostatic image formed by transparent polymer powder or colored polymer powder which is like toner, and formed on a substrate such as paper, by means of a xerographic or other electrostatic image forming methods. Further, "xerographic copy" means the substrate on which the copied image is formed.

Additionally, the image formed as the copied image includes all of the displayed images such as letters, symbols, figures, patterns, etc.

DETAILED DESCRIPTION OF THE PREFERRED EMBODIMENTS

Preferred embodiments of the present invention will be described with reference to the accompanying drawings.

Figure 1:
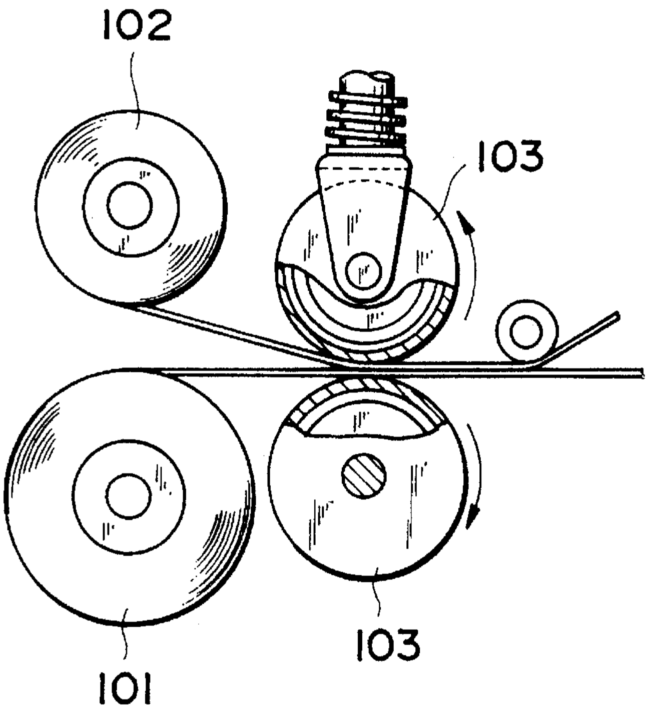
FIG. 1 is a partial outline horizontal cross sectional drawing showing a conventional apparatus.
Figure 2:
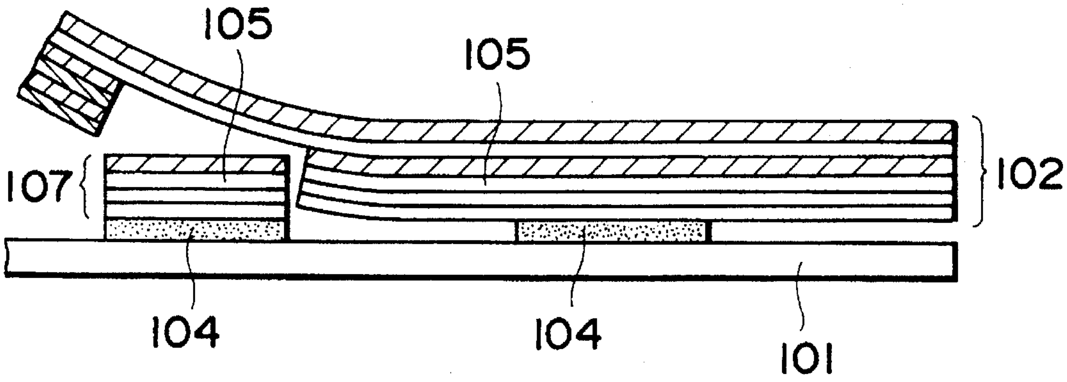
FIG. 2 is a cross sectional drawing showing a conventional transfer sheet.
Figure 3:
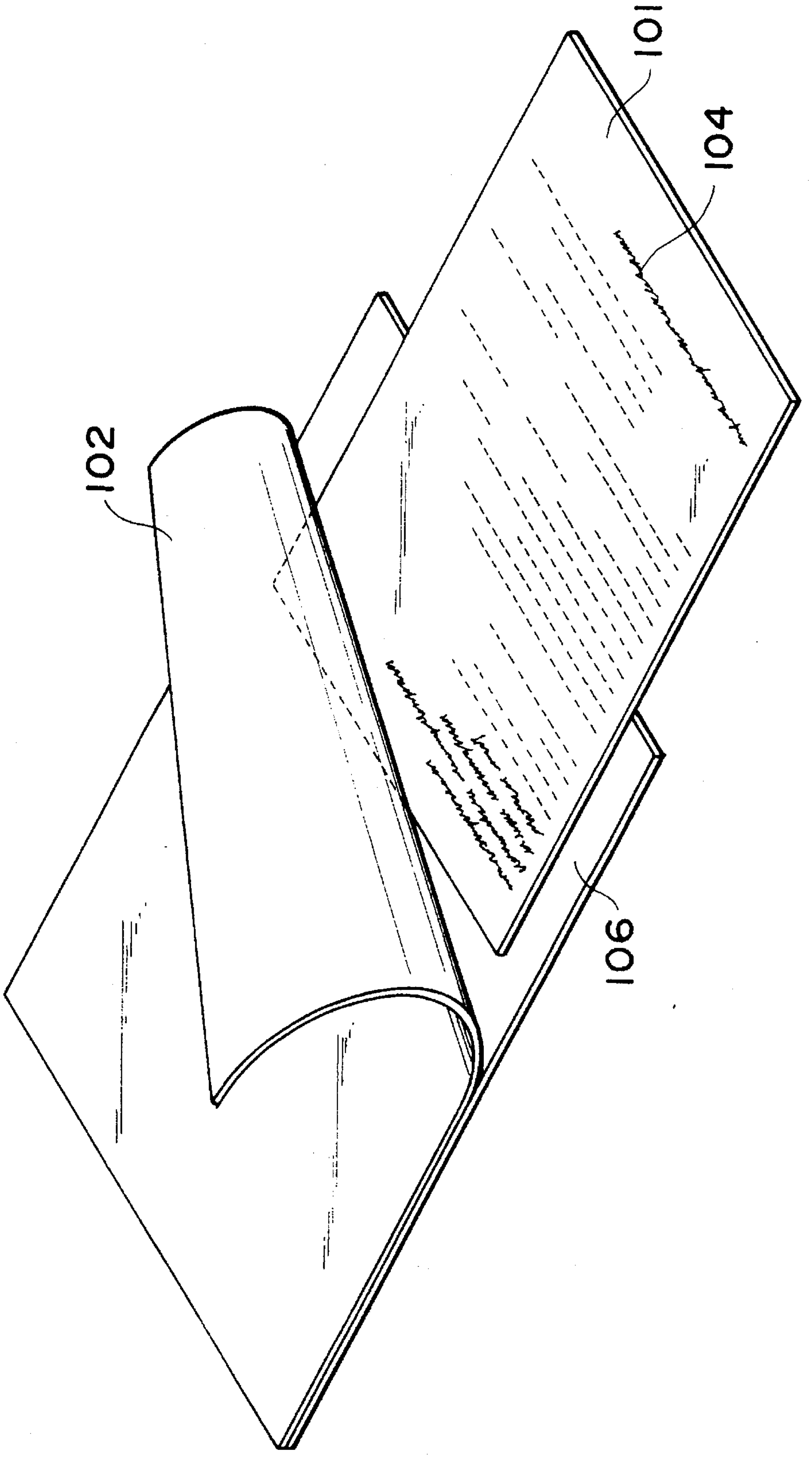
FIG. 3 is a cross sectional drawing showing an alternative form of a conventional transfer sheet.
Figure 4:
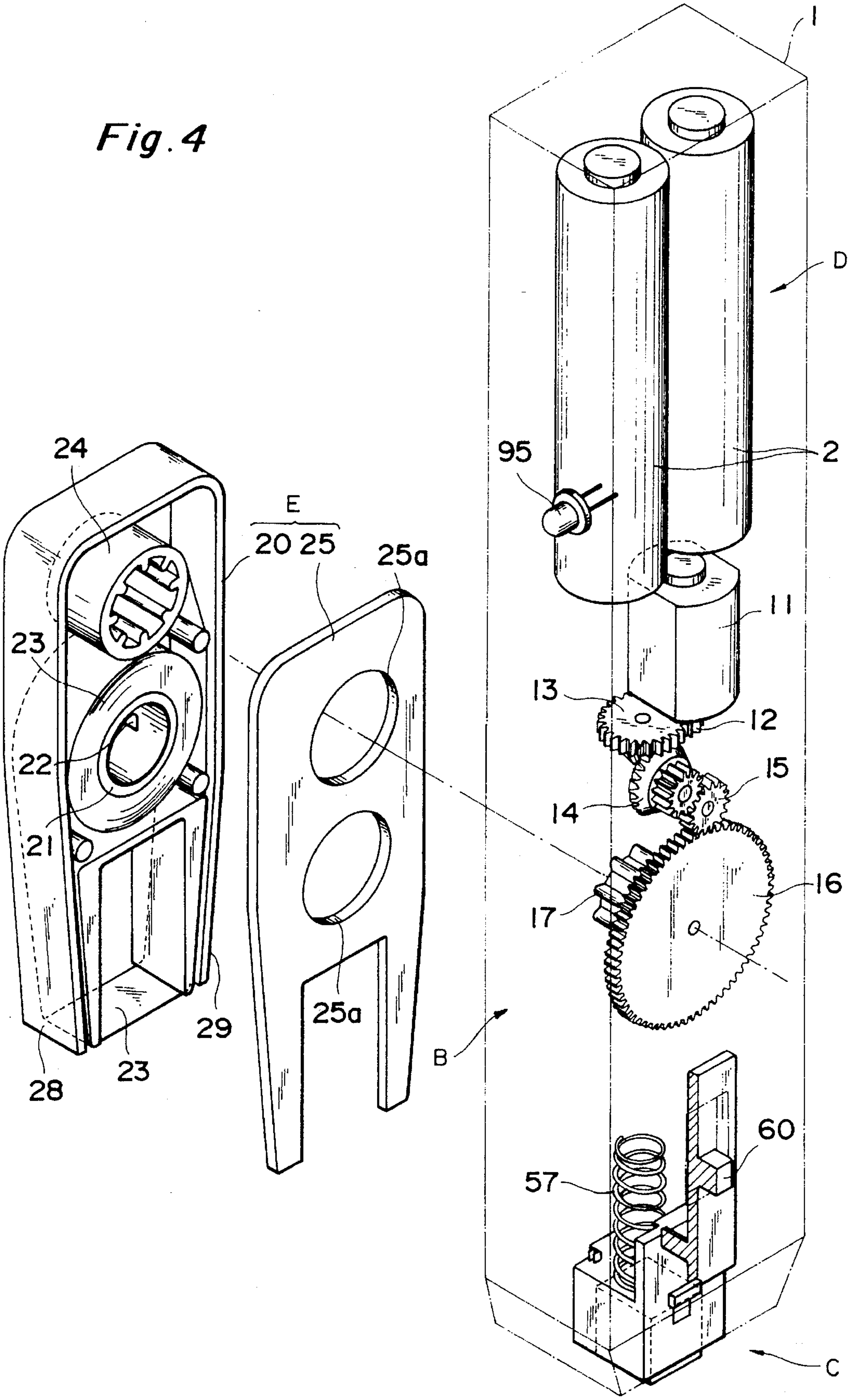
FIG. 4 is a partial perspective view showing an apparatus body composing a coloring apparatus according to the present embodiment and a disassembled ribbon cassette received therein.

In FIG. 4, an outline constitution of a coloring apparatus according to the present embodiment is illustrated. The coloring apparatus comprises a tape feeding portion A for rotating a winding up shaft 17 through a series of gears transmitting a rotation of a driving motor 11 to winding up a transfer tape 23, a tape accommodating portion B for accommodating a ribbon cassette E (described afterward), a transfer head C for pushing the transfer tape 23 onto a xerographic copy and heating the transfer tape, and a battery containing portion D for containing a battery 2 as a power source in this coloring apparatus. Each of these components is disposed and incorporated in the apparatus body 1.

The tape feeding portion A includes the driving motor 11 rotating a pinion gear 12, and the rotation of the pinion gear 12 is transmitted to a main gear 16 through reduction gears 13, 14 and an idling gear 15. The friction spring 18 is disposed coaxially with the main gear 16, and which is frictionally engaged with the main gear 16 with a predetermined friction (See FIG. 5). The winding up shaft 17 is secured to the friction spring 18, whereby the winding up shaft 17 is rotating with the main gear 16. Therefore, while a force to cope with the friction force is acting on the winding up shaft 17, the friction spring 18 is sliding with respect to the main gear 16. According to this function, the transfer tape 23 is wound up by rotating of the winding up shaft 17.

As shown in FIG. 4, the tape accommodating portion B accommodates the ribbon cassette E therein. The ribbon cassette E is composed of a case 20 and a cover 25 having two openings 25*a*. The case 20 accommodates a retaining reel 21 on which the transfer tape 23 is wound up beforehand and a winding up reel 24 for winding up the transfer tape 23 therein. A friction spring 22 is disposed within the retaining reel 21, and the rotating force of the retaining reel 21 is maintained by a predetermined friction force as the friction spring 22 expands outwardly.

As illustrated in FIG. 4, the ribbon cassette E also includes two legs 28, 29 extending approximately in parallel each other, and the transfer tape 23 fed from the retaining reel 21 reaches the winding up reel 24 via the gap between the legs 28 and 29. The legs 28, 29 form a U-shaped space in which the transfer head C should be located, when the ribbon cassette E is installed in the tape accommodating portion B.

Figure 9A:
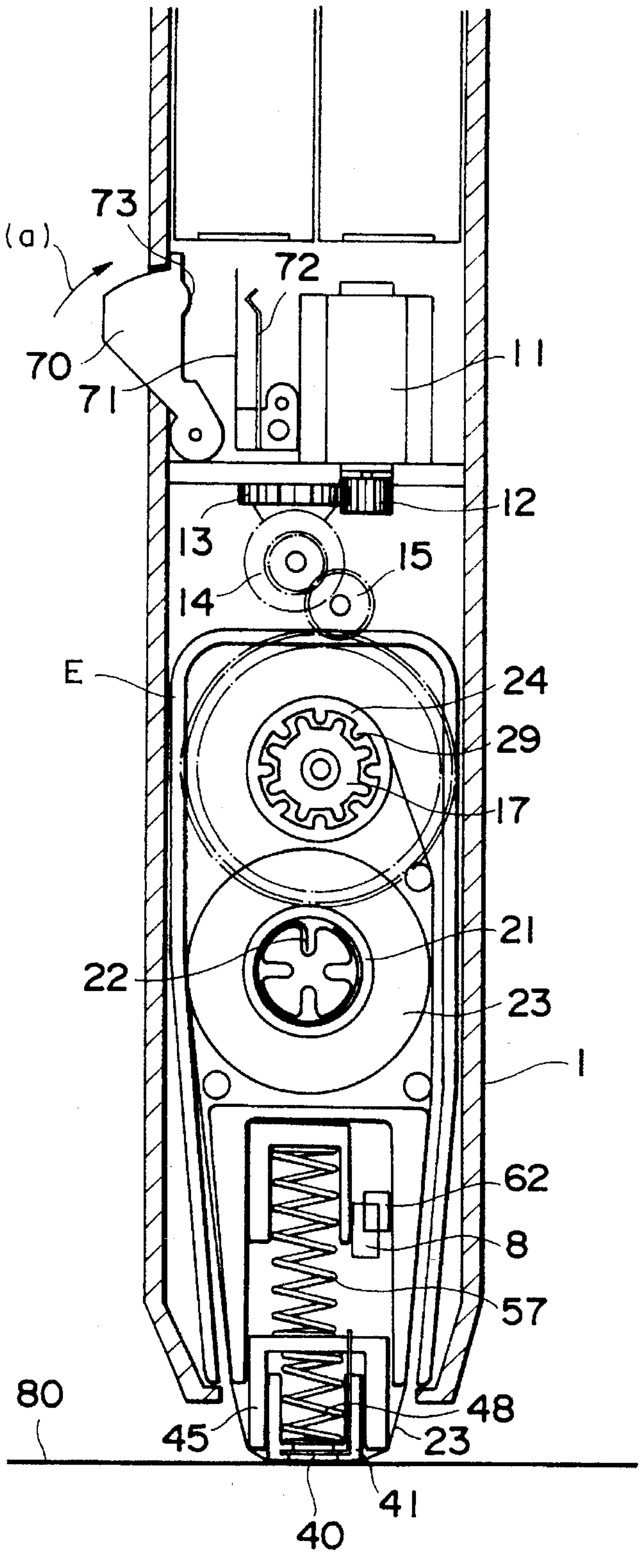
FIG. 9A is a vertical cross sectional drawing showing the apparatus according to the present embodiment just before pushed against a xerographic copy.

Each of housings 41, 45 protrudes from the apparatus body 1 to be urged by each of springs 48, 57 when the ribbon cassette E is installed and, so that the transfer tape 23 via the gap between the legs 28 and 29 is pulled out forwardly (see FIG. 9A). When the ribbon cassette E is put in place, the winding up shaft 17 is connected with the winding up reel 24 resulting in both engaging with each other and rotating together. The transfer tape 23 to be used here has the same characteristics as each sheet disclosed in the above-mentioned U.S. Pat. No. 4,006,267, and see the publication for the detail.

Figure 5:
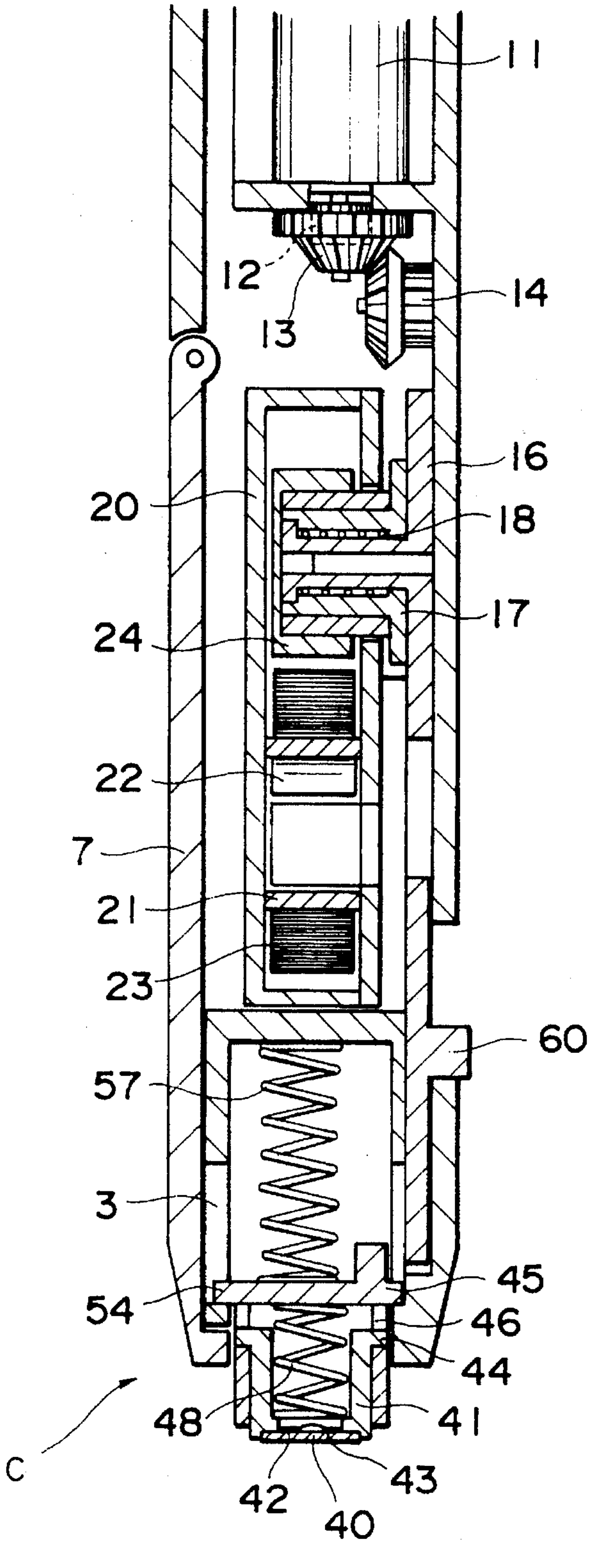
FIGS. 5 and 6 are vertical cross sectional drawings showing main portions of the transfer head separately.
Figure 6:
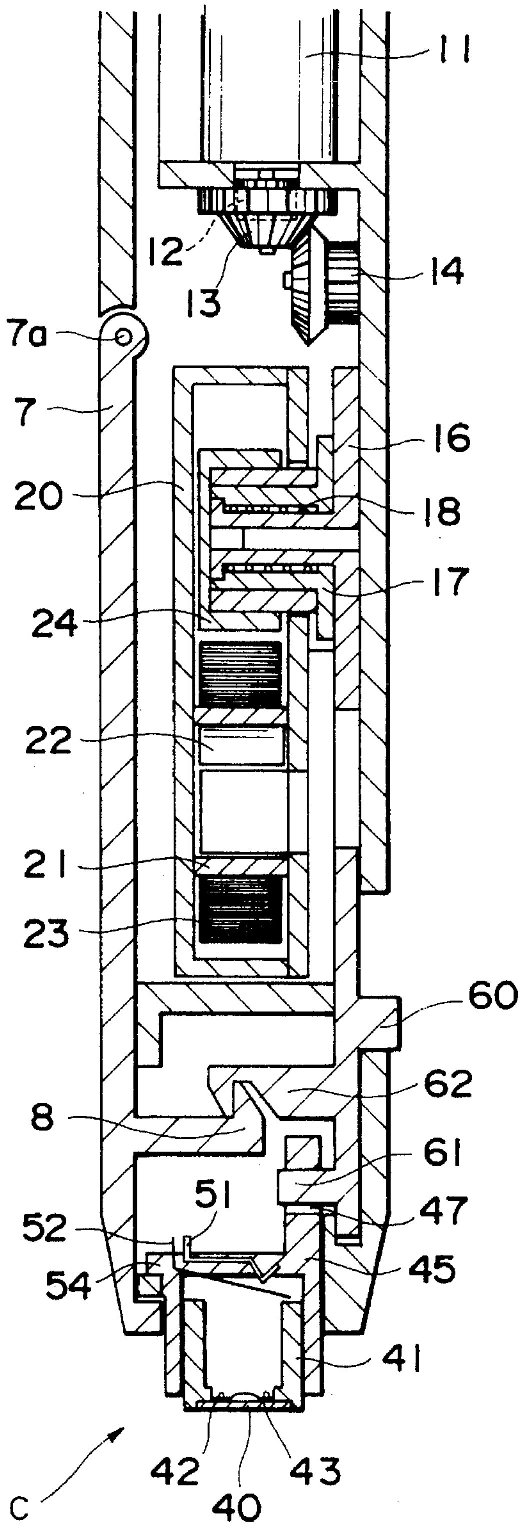

Main portions of the transfer head C are separately illustrated in FIGS. 5 and 6, for the convenience of description. As illustrated in FIG. 5, the transfer head C comprises the first housing 45 and the second housing 41, which are connected as a nest in facing each opening of the housing.

An engaging protrusion 54 of the first housing 45 is slidably inserted in a guide groove 3 formed in the apparatus body 1, which enables the first housing 45 to slide along the guide groove 3. Whereby the first housing 45 is always urged downward by the spring 57 against the apparatus body 1 (see FIG. 5).

On the other hand, an engaging protrusion 44 of the second housing 41 is slidably inserted in a guide groove 46 formed in the first housing 45, which enables the second housing 41 to slide along the guide groove 46. Whereby the second housing 41 is always urged downward by the spring 48 against the first housing 45 (see FIG. 5).

A heating element 40 for heating a toner of the copied image on the xerographic copy is disposed at a pressing face in the lowest portion of the second housing 41, and electrical power is supplied to the heating element 40 through electrodes 42, 43 from a battery 2.

Figure 7:
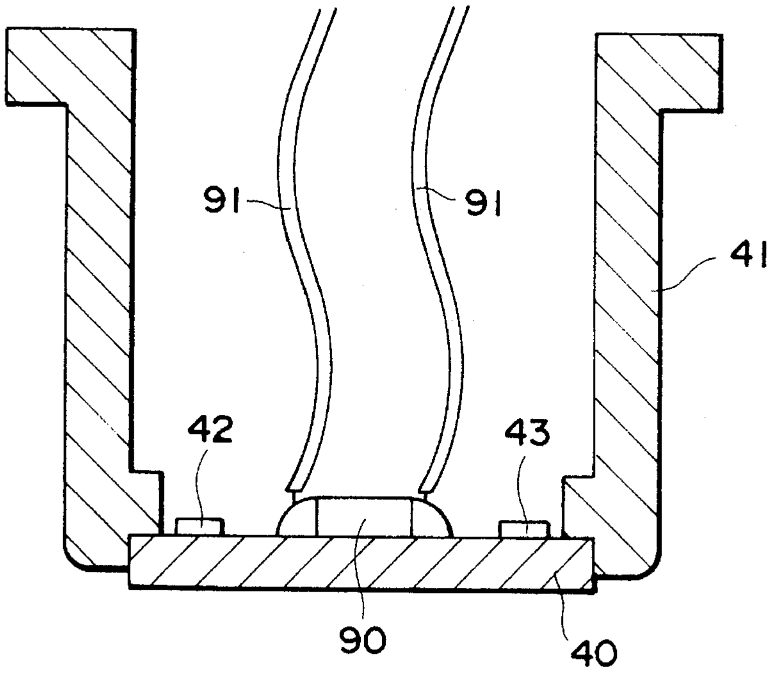
FIG. 7 is an enlarged view of a heating element disposed at a position.
Figure 8:
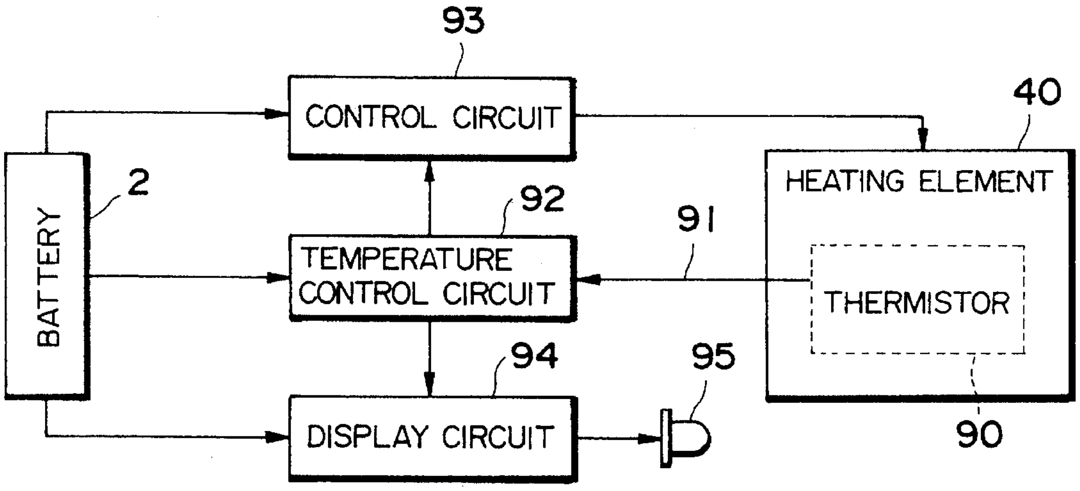
FIG. 8 is a block diagram showing a circuit which controls the temperature of a heating element.

In FIG. 7, the heating element 40 disposed at the position is shown enlarged. A thermistor 90 is disposed at a rear face of the heating element 40 to detect the temperature of the heating element. A signal detected by the thermistor 90 is transmitted through lead wires 91 to a temperature controlling circuit 92, which determines if the temperature of the heating element 40 is appropriate for transferring or not (see FIG. 8). When the temperature of the heating element 40 has not reached an appropriate level a signal showing such fact is transmitted to an output controlling circuit 93 for controlling electricity supplied to the heating element 40. Consequently, electric power is supplied from the battery 2 to the heating element 40 and the temperature of the heating element 40 rises. On the other hand, if the temperature of the heating element 40 has reached an appropriate level, a signal showing such fact is sent to the output controlling circuit 93 from the temperature controlling circuit 92 and the output controlling circuit 93 stops supplying electricity to the heating element 40. At the same time, a display circuit 94 receiving the signal from the temperature controlling circuit 92 turns on a LED 95 disposed at a side face of the apparatus body 1, which informs a user of the apparatus that it is ready for transferring. On and off switching of the power supply to the heating element 40 is under the control of the temperature controller 92, which maintains the temperature of the heating element 40 at a predetermined range. In the present embodiment, the temperature of the heating element 40 is maintained at about 151 degrees centigrade, but the set temperature may be adequately varied depending on a kind of the transfer tape, a pressure to press the transfer tape on the surface to be transferred on, a pressing angle, an assumed moving speed of the apparatus body when transferring or the like. Refer to U.S. Pat. No. 4,006,267 for a preferred pressure, heating temperature etc., this patent being incorporated by reference in its entirety. The above mentioned temperature controlling circuit 92, the output controlling circuit 93 and the display circuit 94 are disposed in the apparatus body.

Further, as illustrated in FIG. 6, a pair of electrode members 51, 52 are secured on the upper portion of the first housing 45, and the electrode member 52 having sheet spring characteristics is pushed up as the second housing 41 moves upwardly to form an electrical contact with the electrode member 51. The electrode members 51, 52 function as a driving switch of the driving motor 11.

Further, a cover 7 which should be opened for installing or removing the above mentioned ribbon cassette E is mounted on the side face of the apparatus body 1. The cover 7 is constituted to hinge around a supporting joint 7*a*. A projection 8 is formed at an inner side of the cover 7 with the inside of the apparatus body 1, and the projection 8 engages with a nail 62 of a locking member 60 disposed facing the cover 7, so that the cover 7 is locked to the apparatus body 1. The locking member 60 is disposed so that it can vertically slide with respect to the apparatus body 1, and a vertical movement of the locking member 60 causes the cover 7 to be locked or released. The locking member 60 has also an engaging projection 61 which is located in a through hole 47 formed on the first housing 45. Consequently, the first housing 45 vertically moves together with the vertical movement of the locking member 60.

Further, as illustrated in FIG. 9A etc., a part of a main switch 70 protrudes outwardly at around the central portion of the apparatus body 1 and the main switch 70 pivotally moves along the direction of an arrow (a) to a switch-by position, on pushing it with a finger in that direction. The main switch 70 has a hinging portion along the side face of the apparatus body 1 around a joint at its base portion. The switch 70 is always urged to turn in a counter clock wise direction (a direction toward the rear side of the drawing sheet) by a spring (not shown in the drawing), to return to a switch-off position. It prevents the switch 70 from being inadvertently pushed in. Further, a pair of electrode members 71, 72 are disposed within the main switch 70, and the electrode member 71 with sheet spring characteristics is pushed by the main switch 70 being pushed in, resulting in formation of an electrical contact with the electrode member 72. Upon the main switch 70 being switched on, the signal is transmitted to the temperature controlling circuit 92 to cause electric power to be supplied to the heating element 40.

Next, the operation of the coloring apparatus constituted as the above is described herein below.

While the apparatus body 1 is held in a hand, the main switch 70 is turned by a thumb in clock wise direction along the side face of the apparatus body 1 and then pushed in. Then the electrode members 71, 72 contact each other to make the main switch 70 turn on and start supplying electric power to the heating element 40, whereby the temperature of the heating element 40 rises (in a condition of preliminary heating). The temperature of the heating element 40 rises, being detected by the thermistor 90. When the temperature reaches a predetermined level, the LED 95 is turned on to inform a user that the apparatus is ready to use.

Figure 9B:
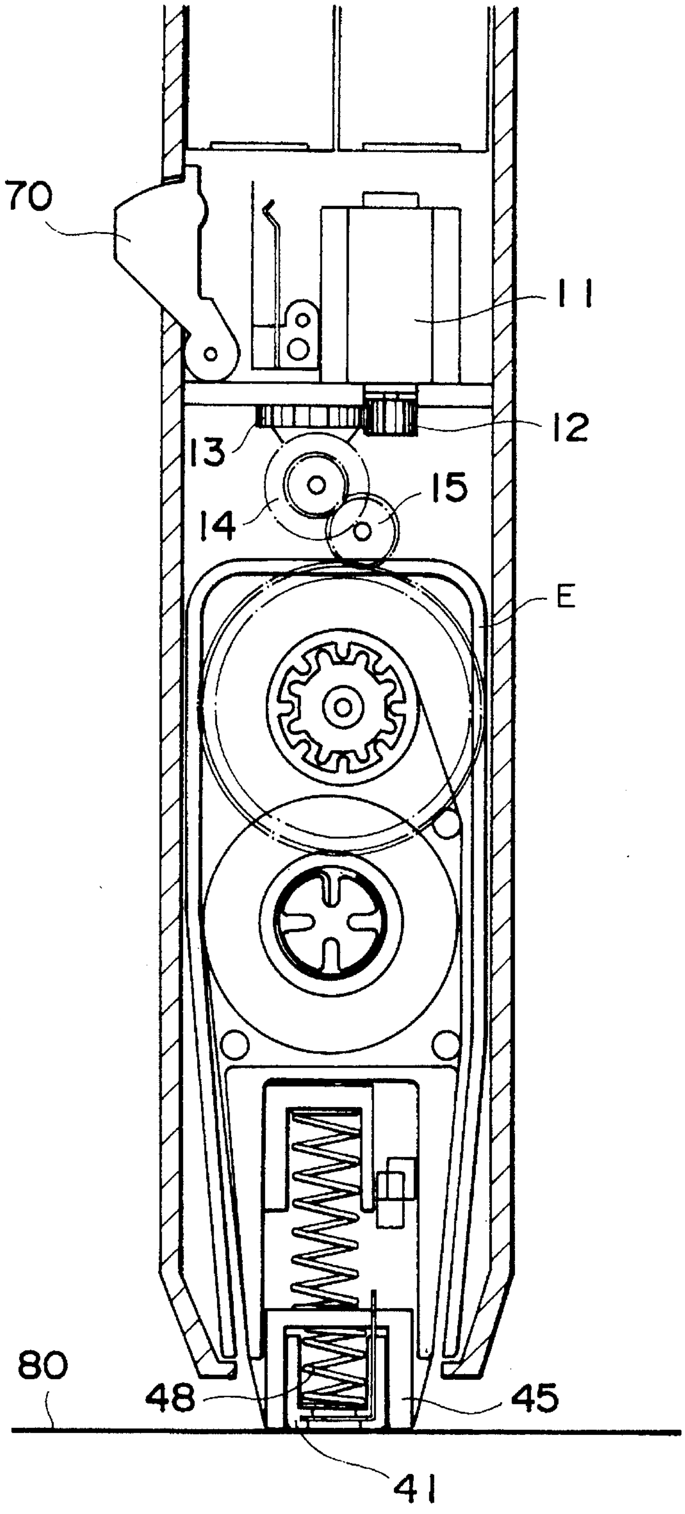
FIG. 9B is a vertical cross sectional drawing showing the apparatus pushed against the xerographic copy.

Next, the transfer head C is pressed onto the copied image, which is formed with toner, on the xerographic copy 80 (FIG. 9A). The pressing force pushes up the second housing 41, on which the heating element 40 is secured, opposing the urging force of the spring 48 to reach the position shown in FIG. 9B. At this time, the electrode member 51 is pushed up by the second housing 41 as shown in FIG. 6 resulting in contact with the opposing electrode member 52. By means of the function of the spring 48, the heating element 40 is always pressed on the surface of the xerographic copy 80 with a pressure in a predetermined range during the transferring operation.

When the pair of electrode members 51, 52 are in contact with each other, electrical power is supplied to the driving motor 11 to cause the motor 11 to start to run. The rotation of the driving motor 11 is transmitted to the main gear 16 through the pinon gear 12, a series of the reduction gears 13, 14 and the idling gear 15. A friction force between the main gear 16 and the friction spring 18 is set smaller than the friction force between the xerographic copy 80 and the transfer tape 23 pushed downward by the spring 48. Consequently, by pressing the heating element 40 to the xerographic copy 80 as described above, the friction spring 18 is slid against the rotating main gear 16. Thus, the winding up shaft 17 does not rotate and does not feed the transfer tape 23 yet.

Subsequently, the apparatus body 1 is moved in a direction opposite to the feeding direction of the transfer tape 23 while the heating element 40 is pressed on the surface of the xerographic copy 80. Then, the toner of the copied image on the xerographic copy 80 becomes sticky by this heating, so that the colored donor layer is stuck onto the toner of the copied image.

At the same time, in response to this movement, the apparatus to feed the transfer tape 23 from the supply side to the winding up side by the friction force between the transfer tape 23 and the xerographic copy 80. In other words, the transfer tape 23 starts to be supplied only when the apparatus body 1 is moved as the transfer head C is pressed on the xerographic copy 80. That is, the transfer tape 23 can be fed always at the same speed as that of the movement of the apparatus 1, wherefore the transfer tape 23 is fed without causing a slip between the xerographic copy 80 and the transfer tape 23.

As described above, the transfer tape 23 is fed as the apparatus body 1 is moved. During this coloring operation, the colored donor layer, which contacts with the toner of the copied image, is stripped off from the transfer tape 23 in a shape corresponding to the copied image, to adhere to the toner of the copied image on the xerographic copy 80, and the rest of the colored donor layer is wound up with the transfer tape 23. Here, the torque of the friction spring 22 disposed within the retaining reel 21 is set larger than the torque required for stripping off the colored donor layer from the transfer tape 23.

Figure 10:
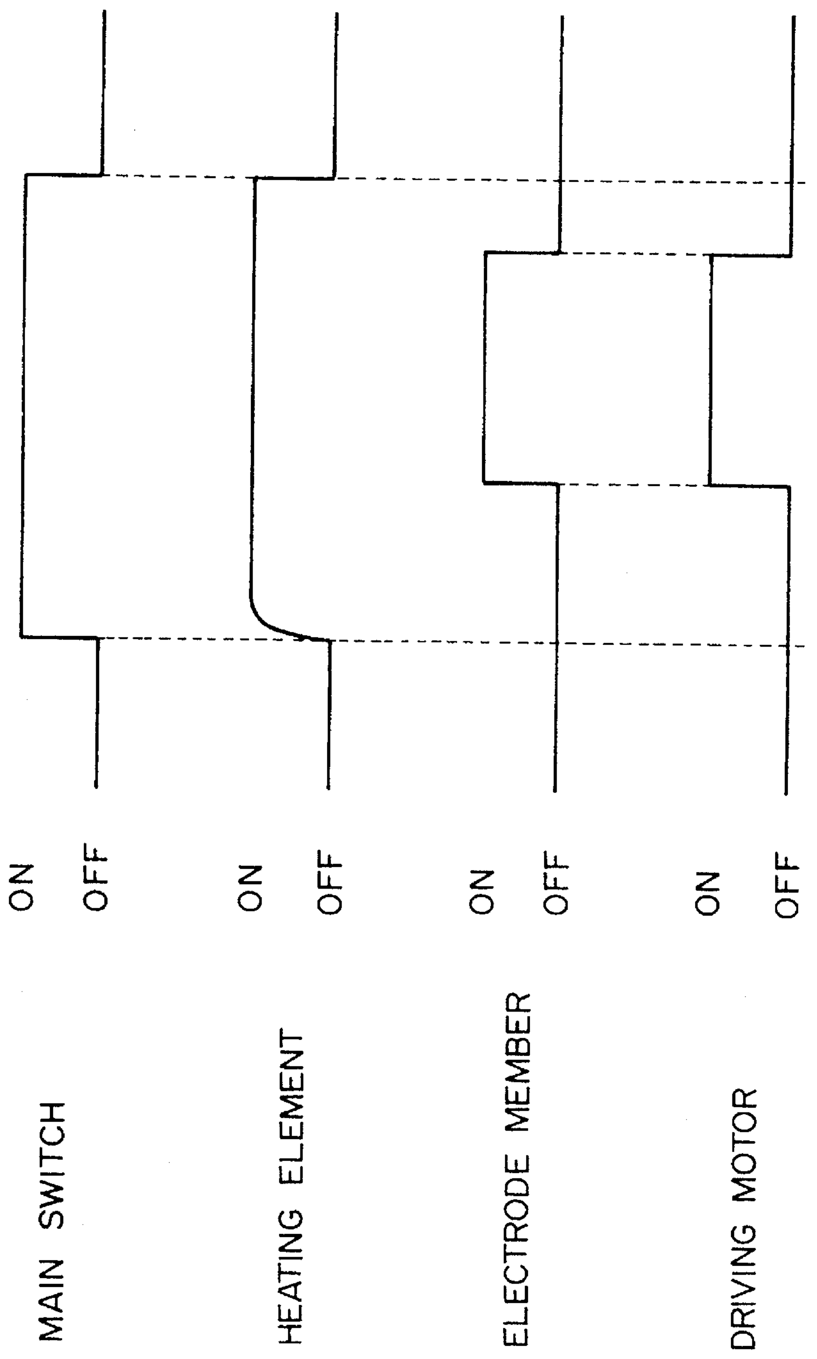
FIG. 10 is a timing chart showing each electrical switch and operation thereof.

When the coloring is finished and the user lifts up the apparatus body 1 from the xerographic copy 80, the first housing 45 and the second housing 41 return to their beginning positions. Then the pair of the electrode members 51, 52 are separated from each other to stop the rotating the motor 11. The timing of the main switch 70, electrode members 51, 52, heating element 40 and driving motor 11 are shown in FIG. 10.

Figure 9C:
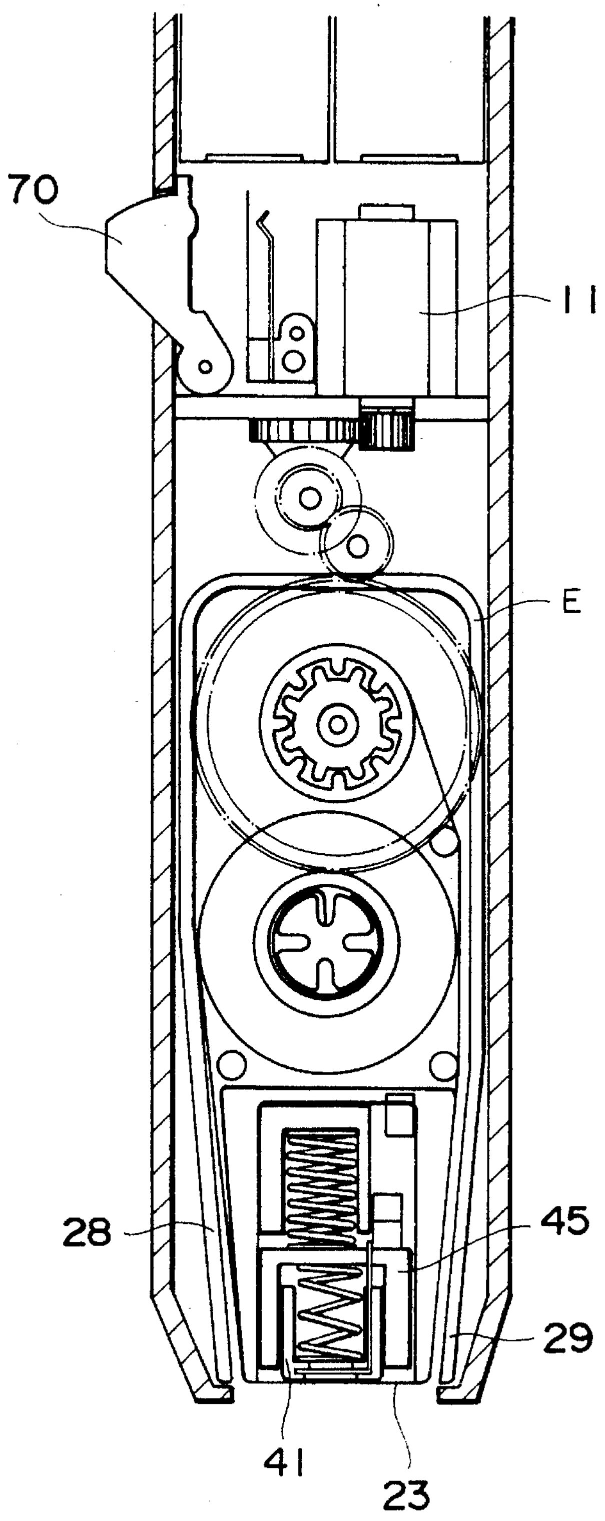
FIG. 9C is a vertical cross sectional drawing showing the apparatus where a transfer head is pulled up by a locking member.

After all of the transfer tape 23 is wound up, the ribbon cassette E is replaced. Upon replacement, the locking member 60 is slid upward in the apparatus body 1 to release the engagement between the projection 62 of the locking member 60 and the projection 8 of the cover 7, which enables the cover 7 to be opened. At the same time, the first housing 45 fixed by the engaging protrusion 61 of the locking member 60 (see FIG. 6) is also pushed upward, which causes the first housing 45 and the second housing 41 to be moved together into the U-shaped space formed by the legs 28, 29 of the ribbon cassette E (FIG. 9C). It enables the ribbon cassette E to be removed from the tape accommodating portion B. According to a reverse process to the above, the ribbon cassette E can be mounted in the apparatus body 1.

The width of the transfer tape to be used in the present embodiment is preferably of a size to accommodate at least one of the letters or symbols in the like to be colored.

Figure 11:
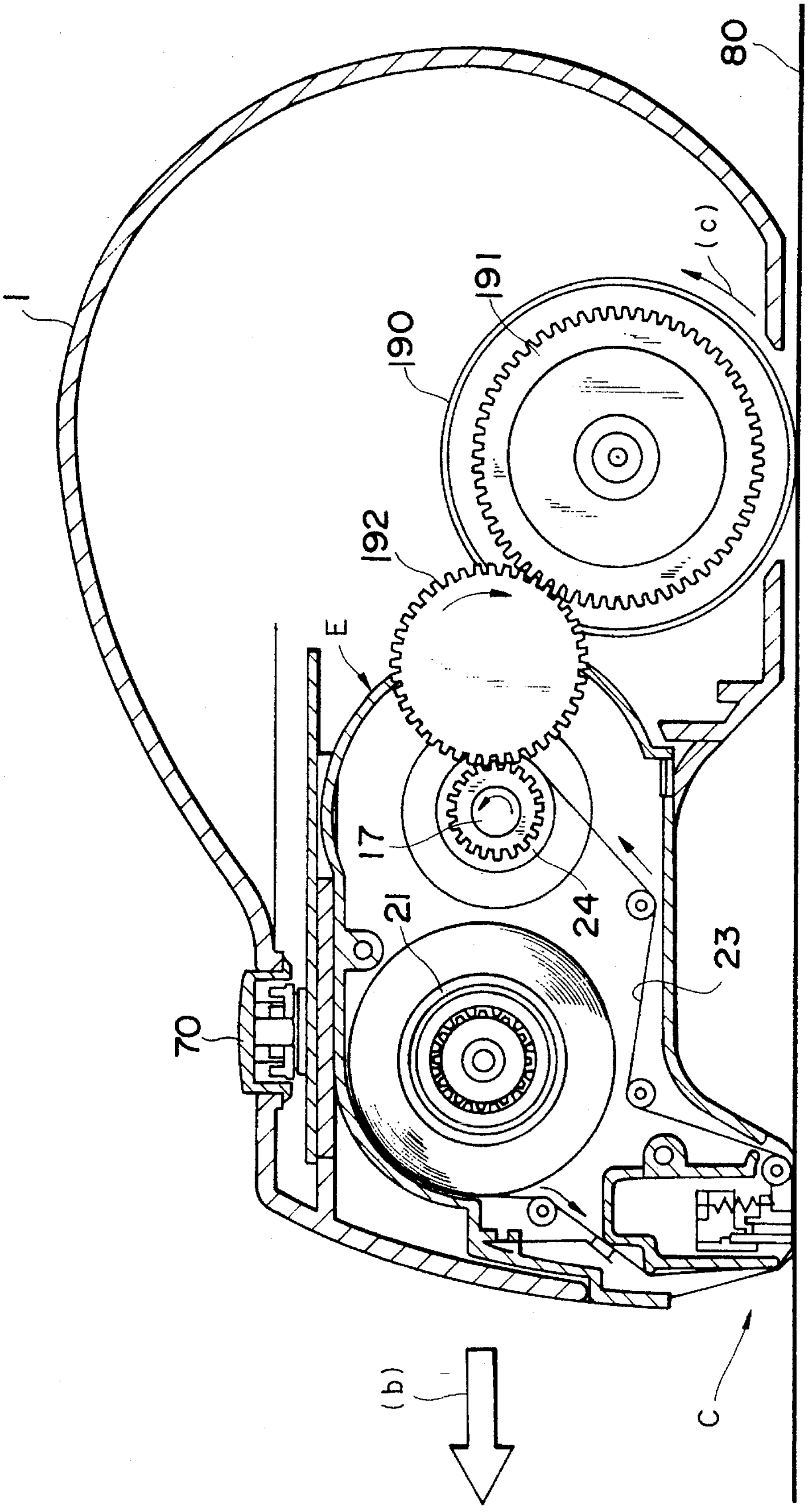
FIG. 11 is a vertical cross sectional drawing showing the other embodiment of the apparatus.

In the above described embodiment, a driving source of the transfer tape 23 is a motor 11 but it is not restricted to the example. For example, shown in FIG. 11, a running roller 190 can be used as a driving source. A periphery of the running roller 190 partially protrudes from the apparatus body 1, and the protruded part is in contact with the surface of the xerographic copy 80 during the coloring operation. While the apparatus body 1 is moved as the transfer head C is pressed on the xerographic copy 80 in a direction of an arrow (b), a friction force against the xerographic copy 80 causes the roller 190 to rotate in the direction of an arrow (c). The rotation of the roller 190 is transmitted to the winding up shaft 17 through a series of gears 191, 192, and then the transfer tape 23 is wound up with response to the movement of the apparatus body 1. Here, in FIG. 11, the same reference symbols are assigned to the same components of the coloring apparatus shown in FIG. 4. The coloring operation of the apparatus shown in FIG. 11 is the same as that shown in FIG. 4, and FIGS. 5 to 9C.

As described above, according to the coloring apparatus embodied as above, coloring the copied image on the xerographic copy can be performed only by pressing the transfer head portion protruding from the apparatus body to the transferred surface and moving the apparatus body in a direction opposite to the feeding direction of the transfer tape, because the transfer head portion, the tape accommodating portion and the tape feeding portion are disposed and incorporated within the apparatus body. Accordingly, while an iron or masking material etc. is conventionally used upon a partial coloring of the copied image on the xerographic copy, it is easy and proper to give coloring or highlighting to the necessary portions of the xerographic copy without using any of those items.

From the foregoing description it will be apparent that the present invention provides an improved coloring apparatus for coloring the copied image. Variations and modifications in the herein described apparatus, within the scope of the invention, will undoubtedly suggest themselves to those skilled in the art. Accordingly, the foregoing description should be taken as illustrative and not in a limiting sense.

What is claimed is:

1. A coloring apparatus for coloring a copied image on a xerographic copy by sticking a colored donor layer of a transfer tape onto the copied image, comprising:

(a) an apparatus body;

(b) a transfer head for pressing the transfer tape against the copied image on the xerographic copy, said transfer head including a first housing slidably supported by said apparatus body, and a second housing slidably supported by said first housing;

(c) a heating element for heating the copied image to a sufficient temperature so as to stick the colored donor layer onto the copied image when the transfer tape is peeled off from the copied image, said heating element being attached to said transfer head;

(d) a first urging means for urging said first housing away from said apparatus body;

(e) a second urging means for urging said second housing away from said first housing; and (f) tape feeding means for feeding the transfer tape in response to the movement of said transfer head without causing a slip between the xerographic copy and the transfer tape, wherein said transfer head is pressed on the copied image and said heating element generates heat, and the transfer tape is fed by said tape feeding means in response to the movement of said transfer head, whereby a part of the colored donor layer of the transfer tape is transferred to the copied image of the xerographic copy.

2. A coloring apparatus for coloring a copied image on a xerographic copy by sticking a colored donor layer of a transfer tape onto the copied image, comprising:

(a) an apparatus body;

(b) a transfer head for pressing the transfer tape against the copied image on the xerographic copy, said transfer head including a first housing slidably supported by said apparatus body, and a second housing slidably supported by said first housing;

(c) a heating element for heating said transfer head;

(d) a first urging means for urging said first housing away from said body;

(e) a second urging means for urging said second housing away from said first housing; and (f) tape feeding means for feeding the transfer tape in response to the movement of said transfer head.

3. A coloring apparatus according to claim 2, wherein said tape feeding means includes:

a) a running roller partially protruding from said apparatus body, said running roller being rotated by a frictional force caused by moving said apparatus body on the xerographic copy; and b) a winding up reel for winding up the transfer tape, said winding up reel being connected to said running roller, said winding up reel being rotated by the rotation of said running roller.

4. A coloring apparatus according to claim 2, wherein said tape feeding means includes:

a) a retaining reel for retaining the transfer tape, said retaining reel being arranged in said apparatus body, wherein the transfer tape is supplied from said retaining reel to said winding up reel.

5. A coloring apparatus according to claim 2, wherein said tape feeding means includes:

a) a retaining reel for retaining the transfer tape, said retaining reel being arranged in said apparatus body; and b) a friction spring disposed within said retaining reel, whereby the transfer tape is not loose while said apparatus body is moved on the xerographic copy.

6. A coloring apparatus according to claim 2, further comprising:

a) an LED attached to said apparatus body; and b) a thermistor for detecting a temperature of said heating element, the thermistor being electrically connected to said LED, wherein said LED turns on when the temperature detected with the thermistor becomes a predetermined temperature, the lighting of said LED informing a user of the apparatus that the apparatus is ready for transferring the colored donor layer, wherein said predetermined temperature is high enough so that the colored donor layer will stick onto the copied image.

7. A coloring apparatus for coloring a copied image on a xerographic copy by sticking a colored donor layer of a transfer tape onto the copied image, comprising:

(a) an apparatus body;

(b) a transfer head for pressing the transfer tape against the copied image on the xerographic copy, said transfer head being attached to said apparatus body;

(c) a heating element for heating said transfer head;

(d) a motor rotated by a power from a power source;

(e) a winding up reel for winding up the transfer tape, said winding up reel being connected to said motor, said winding up reel being rotated by the rotation of said motor;

(f) a first housing slidably supported by said apparatus body;

(g) a second housing slidably supported by said first housing;

(h) a first urging means for urging said first housing away from said apparatus body; and (i) a second urging means for urging said second housing away from said first housing.

8. A coloring apparatus according to claim 2, further comprising:

a) a first electrode member attached to said first housing;

b) a second electrode member disposed between said first electrode member and said second housing, wherein said first electrode member comes into contact with said second electrode member to drive said motor when the second housing moves toward said first housing.

9. A coloring apparatus according to claim 8, further comprising:

a) a winding up shaft engaging with said motor and said winding up reel; and b) a ribbon cassette, said ribbon cassette being detachable from said apparatus body, said ribbon cassette including a retaining reel for retaining the transfer tape, wherein the transfer tape is supplied from said retaining reel to said winding up reel.

10. A coloring apparatus according to claim 9, wherein said ribbon cassette has two legs facing each other, wherein the transfer tape is transferred while contacting the edges of said two legs, wherein said transfer head is disposed between said two legs.

11. A coloring apparatus for coloring a copied image on a xerographic copy by sticking a colored donor layer of a transfer tape onto the copied image, comprising:

(a) an apparatus body;

(b) a transfer head for pressing the transfer tape, said transfer head being attached to said apparatus body;

(c) a heating element for heating said transfer head;

(d) a ribbon cassette disposed in said apparatus body, said ribbon cassette being detachable from said apparatus body, wherein said ribbon cassette includes a winding up reel for winding up the transfer tape, a retaining reel for retaining the transfer tape, wherein the transfer tape is supplied from said retaining reel to said winding up reel;

(e) a winding up shaft engaging with said winding up reel, wherein said winding up reel and said retaining reel are rotated when the winding up shaft is rotated;

(f) a first housing slidably supported by said apparatus body;

(g) a second housing slidably supported by said first housing;

(h) a first urging means for urging said first housing away from said apparatus body; and (i) a second urging means for urging said second housing away from said first housing.

12. A coloring apparatus according to claim 11 further comprising:

a) a cover with a first projection, said cover being attached to said apparatus body, said cover movable relative to said apparatus body; and b) a locking member including a second projection engaging with said first projection, said locking member slidable with respect to said apparatus body, wherein the movement of said locking member causes said cover to be locked or released, wherein said first urging means is disposed between said locking member and said first housing, whereby the movement of said locking member causes said first and second housings to be moved.

* * * * *